(12) United States Patent
Treharne et al.

(10) Patent No.: US 10,293,654 B2
(45) Date of Patent: May 21, 2019

(54) PASSENGER CABIN PRECONDITIONING DURING DC FAST CHARGING EVENTS

(71) Applicant: FORD GLOBAL TECHNOLOGIES, LLC, Dearborn, MI (US)

(72) Inventors: William David Treharne, Ypsilanti, MI (US); Thomas Scott Gee, Canton, MI (US); Christopher Adam Ochocinski, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 710 days.

(21) Appl. No.: 14/657,016

(22) Filed: Mar. 13, 2015

(65) Prior Publication Data

US 2016/0263961 A1    Sep. 15, 2016

(51) Int. Cl.
| | |
|---|---|
| *B60H 1/00* | (2006.01) |
| *H01M 10/42* | (2006.01) |
| *H01M 10/613* | (2014.01) |
| *H01M 10/625* | (2014.01) |

(52) U.S. Cl.
CPC ..... *B60H 1/00278* (2013.01); *B60H 1/00392* (2013.01); *B60H 1/00778* (2013.01); *H01M 10/42* (2013.01); *H01M 10/613* (2015.04); *H01M 10/625* (2015.04)

(58) Field of Classification Search
CPC ............ B60H 1/00278; B60H 1/00392; B60H 1/00778; H01M 10/613; H01M 10/625; H01M 10/42
See application file for complete search history.

(56) References Cited

U.S. PATENT DOCUMENTS

| | | |
|---|---|---|
| 7,441,414 B2 | 10/2008 | Ziehr et al. |
| 8,527,114 B2 | 9/2013 | Ferguson et al. |
| 8,565,969 B2 | 10/2013 | Bradley et al. |
| 2010/0222929 A1 | 9/2010 | Ostermeier et al. |
| 2012/0234930 A1 | 9/2012 | Wijaya |
| 2013/0271074 A1 | 10/2013 | Federico et al. |
| 2014/0039735 A1 | 2/2014 | Major et al. |
| 2014/0277869 A1 | 9/2014 | King et al. |
| 2016/0026659 A1* | 1/2016 | Harley .............. G06F 17/30289 707/758 |

FOREIGN PATENT DOCUMENTS

| | | |
|---|---|---|
| EP | 2679418 A1 | 1/2014 |
| KR | 20120062443 A | 6/2012 |

* cited by examiner

*Primary Examiner* — Michael D Lang
(74) *Attorney, Agent, or Firm* — Carlson, Gaskey & Olds

(57) ABSTRACT

A method according to an exemplary aspect of the present disclosure includes, among other things, automatically preconditioning a passenger cabin of an electrified vehicle during a DC fast charging event of a battery assembly if the electrified vehicle is turned OFF.

22 Claims, 3 Drawing Sheets

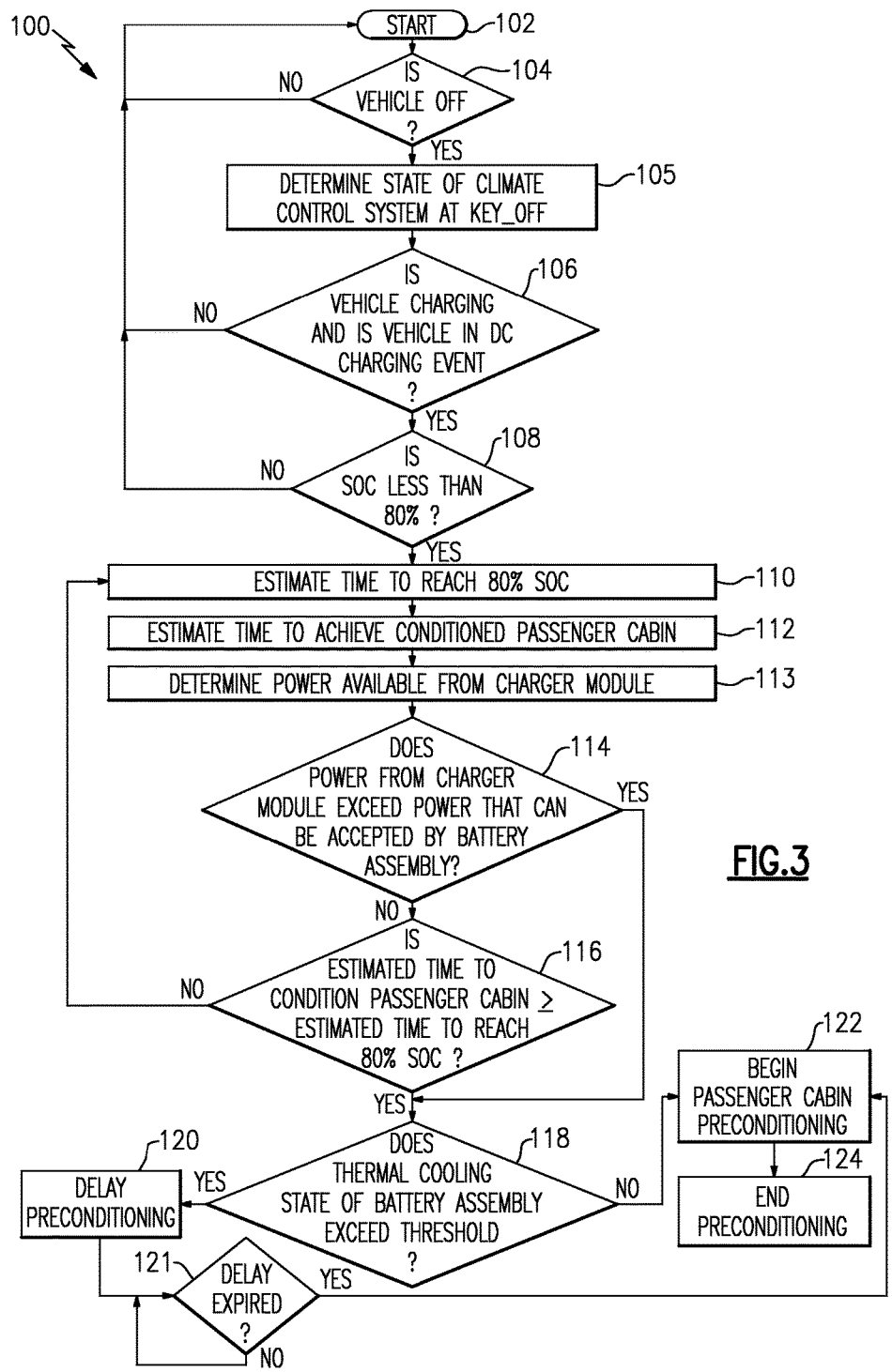

PASSENGER CABIN PRECONDITIONING DURING DC FAST CHARGING EVENTS

TECHNICAL FIELD

This disclosure relates to a vehicle system and method associated with an electrified vehicle. The vehicle system is configured to precondition a passenger cabin of an electrified vehicle during battery DC fast charging events.

BACKGROUND

The need to reduce fuel consumption and emissions in vehicles is well known. Therefore, vehicles are being developed that reduce or completely eliminate reliance on internal combustion engines. Electrified vehicles are one type of vehicle currently being developed for this purpose. In general, electrified vehicles differ from conventional motor vehicles in that they are selectively driven by one or more battery powered electric machines. Conventional motor vehicles, by contrast, rely exclusively on the internal combustion engine to drive the vehicle.

Electrified vehicle powertrains are typically equipped with a high voltage battery pack having a plurality of battery cells that store electrical power for powering the electric machines. The battery cells must be charged prior to vehicle use. When parked, some electrified vehicles, such as plug-in hybrid electric vehicles or battery electric vehicles, may connect to an external power source to recharge the battery cells.

When the vehicle is taken off-plug, energy from the battery pack must be used to regulate the temperature of the battery cells and to operate the heating, ventilation and air conditioning (HVAC) system for conditioning the passenger cabin of the vehicle. This energy use reduces the range of the vehicle because part of the energy must be used for purposes other than vehicle propulsion.

SUMMARY

A method according to an exemplary aspect of the present disclosure includes, among other things, automatically preconditioning a passenger cabin of an electrified vehicle during a DC fast charging event of a battery assembly if the electrified vehicle is turned OFF.

In a further non-limiting embodiment of the foregoing method, the preconditioning step begins prior to the state of charge (SOC) of the battery assembly reaching a predefined threshold value.

In a further non-limiting embodiment of either of the foregoing methods, the preconditioning step includes conditioning the passenger cabin based on a state of a climate control system of the electrified vehicle at key-off.

In a further non-limiting embodiment of any of the foregoing methods, the method includes ending the preconditioning step if the DC fast charging event ends.

In a further non-limiting embodiment of any of the foregoing methods, the method includes ending the preconditioning step after a predefined threshold amount of time if a vehicle operator has not yet returned to the electrified vehicle.

In a further non-limiting embodiment of any of the foregoing methods, the method includes determining when to start preconditioning the passenger cabin prior to performing the preconditioning step.

In a further non-limiting embodiment of any of the foregoing methods, the preconditioning step is started if the power from a charger module exceeds the amount of power that can be accepted by the battery assembly during the DC fast charging event.

In a further non-limiting embodiment of any of the foregoing methods, the method includes determining a battery cooling thermal state of the battery assembly prior to performing the preconditioning step.

In a further non-limiting embodiment of any of the foregoing methods, the method includes delaying the preconditioning step if the amount of cooling the battery assembly requires exceeds a predefined threshold.

In a further non-limiting embodiment of any of the foregoing methods, the preconditioning step includes heating or cooling the passenger cabin by actuating a HVAC system of the electrified vehicle.

In a further non-limiting embodiment of any of the foregoing methods, the preconditioning step is started if the power from a charger module exceeds the amount of power that can be accepted by the battery assembly.

In a further non-limiting embodiment of any of the foregoing methods, the preconditioning step is started at a first start time if an ambient temperature is different from a desired passenger cabin temperature by a first amount and is started at a second, different start time if the ambient temperature is different from the desired passenger cabin temperature by a second amount.

In a further non-limiting embodiment of any of the foregoing methods, the preconditioning step includes conditioning the passenger cabin to a level indicated by a prior climate control setting, a predefined set point or a remote start climate setting.

In a further non-limiting embodiment of any of the foregoing methods, the method includes meeting the cooling requirements of the battery assembly prior to performing the preconditioning step.

In a further non-limiting embodiment of any of the foregoing methods, the preconditioning step is started if an estimated time to condition the passenger cabin is greater than or equal to an estimate time to reach an 80% state of charge of the battery assembly.

A vehicle system according to another exemplary aspect of the present disclosure includes, among other things, a passenger cabin, a HVAC system configured to modify a temperature inside the passenger cabin, a battery assembly, a charger module configured to charge the battery assembly and a control module configured to command the HVAC system to precondition the passenger cabin during a DC fast charging event.

In a further non-limiting embodiment of the foregoing vehicle system, the HVAC system includes a heater, a compressor and a HVAC case, the HVAC case housing a heating element, a cooling element and a blower.

In a further non-limiting embodiment of either of the foregoing vehicle systems, the charger module connects between the battery assembly and an external power source, the charger module configured to selectively supply energy to charge the battery assembly during the DC fast charging event.

In a further non-limiting embodiment of any of the foregoing vehicle systems, a user interface is located within the passenger cabin and configured to enable vehicle passengers to control the HVAC system to achieve a desired temperature inside the passenger cabin.

In a further non-limiting embodiment of any of the foregoing vehicle systems, a cooling device is configured to remove heat from the battery assembly during the DC fast charging event.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 3 schematically illustrates a control strategy for preconditioning a passenger cabin of an electrified vehicle during DC fast charging events.

DETAILED DESCRIPTION

This disclosure describes a vehicle system and method for preconditioning a passenger cabin of an electrified vehicle during DC fast charging events. In some embodiments, the passenger cabin is preconditioned to a desired temperature by a HVAC system if the electrified vehicle is turned OFF and if the battery assembly of the electrified vehicle has not yet reached an 80% state of charge (SOC). The passenger cabin may be preconditioned to a desired state based on a previous climate control setting of the electrified vehicle, such as the setting used during a previous drive cycle of the vehicle. In other embodiments, the preconditioning begins when the power from a charger module exceeds the amount of power the battery assembly can accept during charging. These and other features are discussed in greater detail in the following paragraphs of this detailed description.

Figure 1:
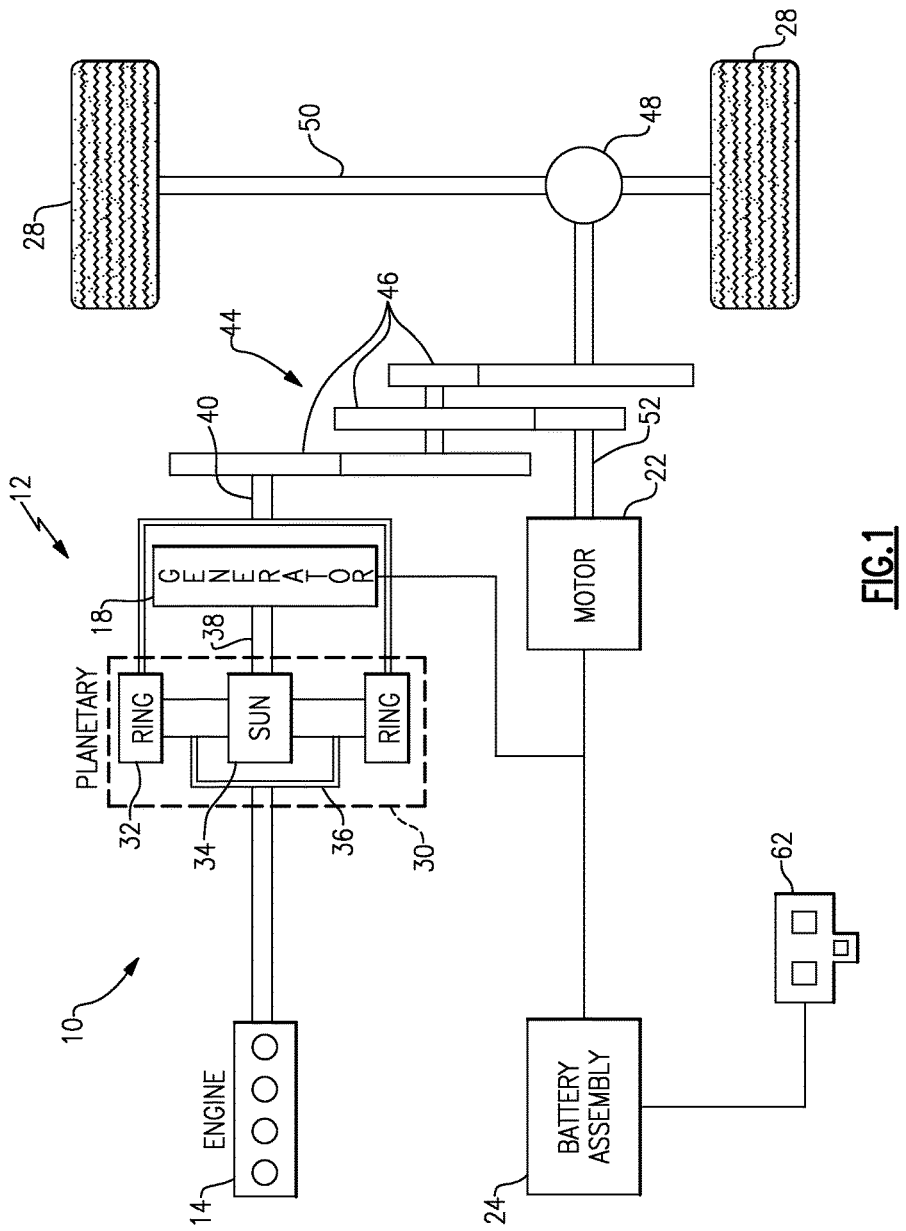
FIG. 1 schematically illustrates a powertrain of an electrified vehicle.

FIG. 1 schematically illustrates a powertrain 10 of an electrified vehicle 12. The electrified vehicle 12 of FIG. 1 is depicted as a plug-in hybrid electric vehicle (PHEV) in this embodiment; however, it should be understood that the concepts of this disclosure are not limited to PHEV's and could extend to other electrified vehicles, including, but not limited to, battery electric vehicles (BEV's).

In one non-limiting embodiment, the powertrain 10 is a power-split powertrain system that employs a first drive system and a second drive system. The first drive system includes a combination of an engine 14 and a generator 18 (i.e., a first electric machine). The second drive system includes at least a motor 22 (i.e., a second electric machine) and a battery assembly 24. In this example, the second drive system is considered an electric drive system of the powertrain 10. The first and second drive systems generate torque to drive one or more sets of vehicle drive wheels 28 of the electrified vehicle 12.

The engine 14, which may be an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 cooperates as part of a regenerative braking system in which it can be employed to output torque. For example, the motor 22 can output electrical power to the battery assembly 24.

The battery assembly 24 is an example type of electrified vehicle battery assembly. The battery assembly 24 may include a high voltage battery pack that is capable of outputting electrical power to operate the motor 22 and the generator 18. Other types of energy storage devices and/or output devices can also be used to electrically power the electrified vehicle 12.

In a non-limiting PHEV embodiment of the electrified vehicle 12, the battery assembly 24 may be recharged or partially recharged using a charging module 62 that is connected to a charging station powered by an external power source, such as an electrical grid, a solar panel, or the like.

In one non-limiting embodiment, the electrified vehicle 12 has at least two basic operating modes. The electrified vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the electrified vehicle 12. During EV mode, the state of charge of the battery assembly 24 may increase in some circumstances, for example due to a period of regenerative braking. The engine 14 is generally not permitted to operate under a default EV mode but could be operated as necessary based on a vehicle system state or as permitted by the operator.

The electrified vehicle 12 may additionally be operated in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes.

Figure 2:
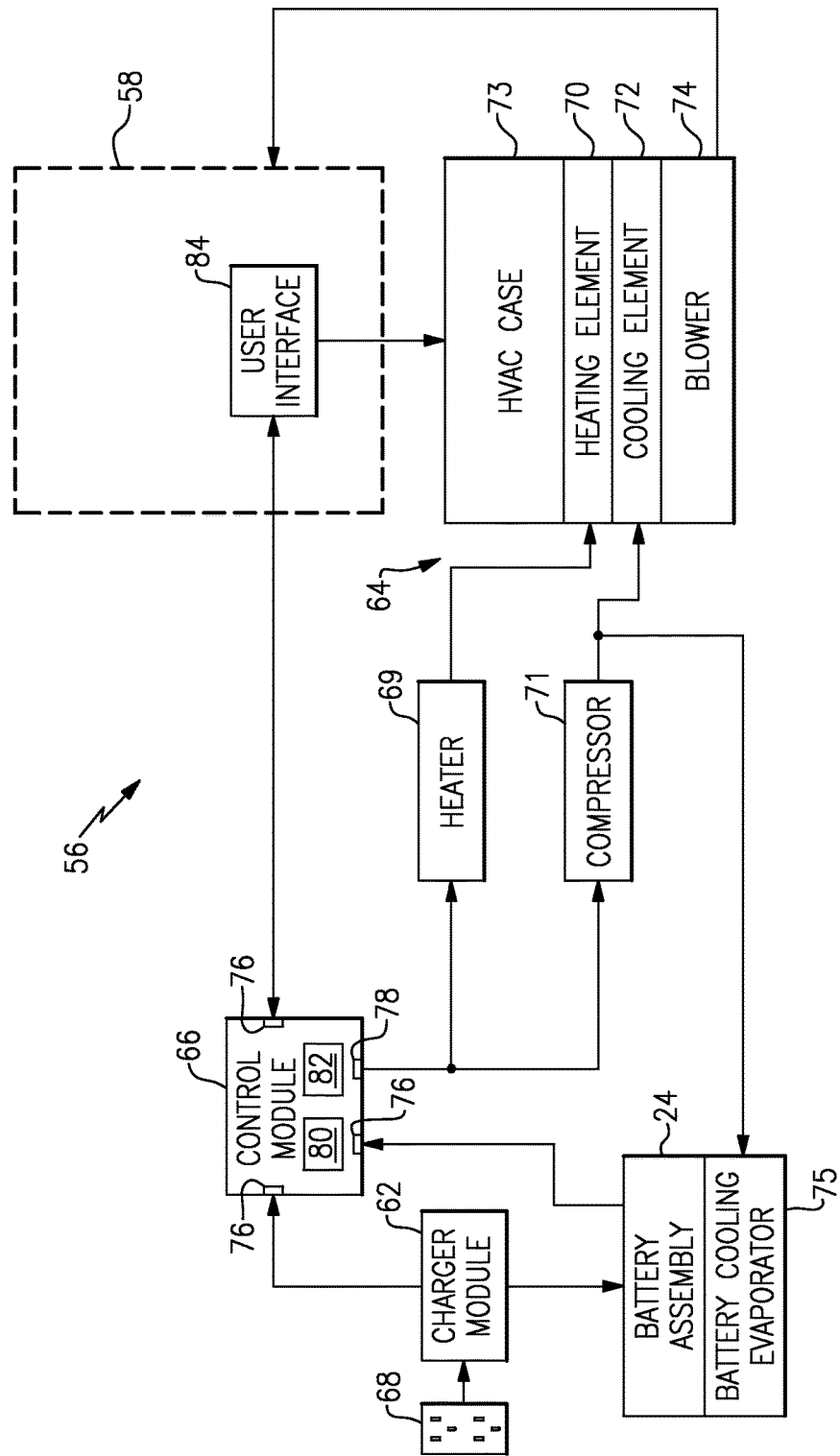
FIG. 2 illustrates a vehicle system of an electrified vehicle.

FIG. 2 is a highly schematic depiction of a vehicle system 56 that may be incorporated into a vehicle, such as the electrified vehicle 12 of FIG. 1. The vehicle system 56 is adapted to precondition a passenger cabin 58 of the electrified vehicle to a desired temperature during DC fast charging of the battery assembly 24. DC fast charging events are immediate charge events that typically last approximately thirty minutes or less. A DC fast charging system uses direct current of approximately 50 A to over 500 A to quickly charge the battery assembly 24, versus a typical 4 A to 15 A for a standard alternating current charger.

In one non-limiting embodiment, the exemplary vehicle system 56 includes the high voltage battery assembly 24, a charger module 62, a HVAC system 64 and a control module 66. The high voltage battery assembly 24 may include one or more battery cells, capacitors, or other energy storage devices. The energy storage devices of the battery assembly 24 store electrical energy that may be supplied to power various loads residing on-board the electrified vehicle 12. The loads may include various high voltage electric loads (e.g., electric machines, etc.) or various low voltage electrical loads (e.g., lighting systems, low voltage batteries, logic circuitry, etc.).

The charger module 62 connects between the battery assembly 24 and an external power source 68 and selectively supplies the energy required to charge the battery assembly 24. In one embodiment, the charger module 62 plugs into the external power source 68 to receive electrical power and deliver it to the battery assembly 24. The external power source 68 may include off-board power, such as utility/grid power.

In one embodiment, the charger module 62 is configured to charge the battery assembly 24 during DC fast charging events. If necessary, the charger module 62 may convert alternating current (AC) received from the external power source 68 to direct current (DC) for DC fast charging the battery assembly 24. In an alternative embodiment, a device separate from the vehicle is configured to perform the AC to DC conversion. The charger module 62 is also configured to establish a maximum available charging current for charging the battery assembly 24.

The HVAC system 64 is equipped to modify the temperature inside the passenger cabin 58. The HVAC system 64 may include a heater 69, a compressor 71 and a HVAC case 73. The HVAC case 73 houses a heating element 70, a cooling element 72 and a blower 74. In one embodiment, the heater 69 is an electric heater, such as a positive temperature coefficient heater. If heating is demanded within the passenger cabin 58, the heater 69 may heat a fluid, such as water, which is then communicated to the heating element 70 for exchanging heat with airflow that is blown across the heating element 70 by the blower 74. The fluid loses heat to the airflow, which may then be communicated to heat the passenger cabin 58. Alternatively, if cooling is demanded within the passenger cabin 58, the compressor 71 compresses a refrigerant, which is then communicated to the cooling element 72. The refrigerant is expanded in the cooling element 72. The expanded refrigerant absorbs heat from airflow that is blown across the cooling element 72 by the blower 74. The airflow is then communicated to cool the passenger cabin 58. In one non-limiting embodiment, the heating element 70 is a heater core and the cooling element 72 is an evaporator core. However, other heating and cooling devices may also be utilized to heat and/or cool the passenger cabin 58 within the scope of this disclosure.

The blower 74 may be controlled to cause airflow to flow through the HVAC system 64 and into the passenger cabin 58. In one embodiment, the blower 74 is a variable speed blower for causing airflow to flow into and through the heating and/or cooling elements 70, 72, through ducts and other conduits of the HVAC system 64, and into the passenger cabin 58.

Although not shown in the highly schematic depiction of FIG. 2, the HVAC system 64 could include an arrangement of ducts, conduits, doors and/or actuators that are employable to direct airflow through either the heating element 70 or the cooling element 72 to adjust the temperature of the airflow. In another embodiment, the ducts, doors, conduits and/or actuators may be employed to control a mixture of ambient air with air that has been recirculated from the passenger cabin 58. The ducts may be in fluid communication with the plurality of vents which direct the heated or cooled air into the passenger cabin 58 for adjusting its temperature.

The vehicle system 56 may additionally include a battery cooling evaporator 75, or some other cooling device, for thermally managing heat generated by the battery assembly during certain events, such as during DC fast charging events. The compressor 71 of the HVAC system 64 may transfer compressed refrigerant through the battery cooling evaporator 75 to remove heat from the battery assembly 24.

In yet another embodiment, the vehicle system 56 includes a user interface 84 for communicating information to the driver operator. In one embodiment, the user interface 84 is located inside the passenger cabin 58 and includes various knobs, buttons, actuators, touch screens, etc. for providing vehicle passengers with the ability to select various settings, including climate control settings. For example, the user interface 84 may enable vehicle passengers to control the HVAC system 64 to achieve a desired temperature inside the passenger cabin 58. The user interface 84 may also provide a visual output to the passengers.

The control module 66 may be part of an overall vehicle control unit, such as a vehicle system controller (VSC), or could alternatively be a standalone control unit separate from the VSC. In one embodiment, the control module 66 includes executable instructions for interfacing with and operating the various components of the vehicle system 56, including but not limited to, the charger module 62, the HVAC system 64, the battery assembly 24 and the user interface 84. The control module 66 may include multiple inputs 76 and outputs 78 for interfacing with the various components of the vehicle system 56. In another embodiment, the control module 66 includes a processing unit 80 and non-transitory memory 82 for executing the various control strategies and modes of the vehicle system 56. In some non-limiting embodiments, the control module 66 is configured to receive climate status at each vehicle key-off, determine the time to complete charging of the battery assembly 24, determine the cooling needs of the battery assembly 24, determine when to begin preconditioning the passenger cabin 58, among other functions.

FIG. 3, with continued reference to FIGS. 1-2, schematically illustrates a control strategy 100 for controlling the vehicle system 56. The control strategy 100 may be performed to precondition the passenger cabin 58 of the electrified vehicle 12 during DC fast charging of the battery assembly 24. The control module 66 may be programmed with one or more algorithms adapted to execute the control strategy 100, or any other control strategy. In one non-limiting embodiment, the control strategy 100 may be stored as executable instructions in the non-transitory memory 82 of the control module 66.

As shown in FIG. 3, the control strategy 100 begins at block 102. At block 104, the control strategy 100 determines whether or not the electrified vehicle 12 is OFF. For example, the control module 66 of the vehicle system 56 may confirm a key-off status of the vehicle ignition of the electrified vehicle 12.

If the electrified vehicle 12 is OFF, the control strategy 100 determines a state of the climate control system at block 105. For example, the control module 66 may determine if the climate control system was "ON," providing either heating and/or cooling, using user interface 84, at the previous key-off event (i.e., the climate control setting used during a previous drive-cycle).

Next, the control strategy 100 proceeds to block 106 by confirming whether or not the electrified vehicle 12 is charging and if the electrified vehicle is in a DC fast charging event. The control module 66 may determine whether a DC fast charging event has been requested. For example, the control module 66 can communicate with the charger module 62 to confirm whether the battery assembly 24 is being charged in a DC fast charging event.

Next, at block 108, the control strategy 100 confirms whether or not the state of charge (SOC) of the battery assembly 24 is less than 80% (or some other predefined threshold value). Passenger cabin 58 preconditioning aims for the passenger cabin 58 to be conditioned by 80% SOC but will continue to precondition past 80% SOC, up to 100%, if the customer has not unplugged the electrified vehicle 12 from the power source 68. The time savings from using DC fast charging is reduced at SOC's greater than 80%, and therefore it is expected that most customers will end charging at around 80% SOC's.

The control module 66 next determines when to begin preconditioning the passenger cabin 58. The start time of the preconditioning may be a function of multiple factors. For example, the start time of preconditioning may be based on a time estimation to reach an 80% SOC (block 110), a time estimation to achieve a conditioned passenger cabin 58 (block 112), and a determination of the amount of power available from the charger module 62 (block 113).

In one embodiment, the time estimation to achieve a conditioned passenger cabin 58 may be function of at least ambient temperature and a desired passenger cabin temperature (e.g., 72° F. or some other predefined temperature value). The farther away the ambient temperature is from the desired passenger cabin temperature, the earlier the passenger cabin 58 preconditioning may be started. Logic for deriving the preconditioning start times may be programmed within the control module 66, such as within a look-up table. By way of one non-limiting example, a first start time may be employed to begin preconditioning if the ambient temperature is 20° less than the desired passenger cabin temperature, whereas a second, later start time may be employed if the ambient temperature is only 10° less than the desired passenger cabin temperature. This again is only intended as a non-limiting example.

In one non-limiting embodiment, preconditioning of the passenger cabin 58 is started if it is determined at block 114 that the power from the charger module 62 exceeds the amount of power that can be accepted by the battery assembly 24. For example, if the charger module 62 is supplying power at 50 kW and the battery assembly 24 can only accept 45 kW for charging, then the preconditioning may begin by using the extra 5 kW of power to actuate the HVAC system 64. This, of course, is intended as a non-limiting example. The preconditioning of the passenger cabin 58 may alternatively be started if it is determined at block 116 that the estimated time to condition the passenger cabin 58 (from block 112) is greater than or equal to the estimated time to reach 80% SOC (from block 110).

At block 118, the control strategy 100 determines whether a thermal cooling state of the battery assembly 24 exceeds a predefined threshold. The control module 66 may monitor the battery assembly 24 to determine the amount of cooling it requires, if any, and may command the compressor 71 and the battery cooling evaporator 75 to achieve a desired battery thermal cooling state. In one embodiment, the control module 66 schedules cooling of the battery assembly 24 during the first part of the DC fast charging event, which is when the majority of the heat is typically generated by the battery assembly 24. If the amount of cooling the battery assembly 24 requires exceeds the predefined threshold and preconditioning is schedule to begin, the preconditioning can be delayed at block 120. By way of one non-limiting embodiment, if the electrified vehicle 12 is 15 minutes away from reaching an 80% SOC and is running maximum air conditioning for battery assembly 24 cooling, then the preconditioning can be delayed by a predefined amount of time to ensure sufficient cooling of the battery assembly 24. Once a predefined delay has expired at block 121, the method may proceed to block 122 and begin preconditioning of the passenger cabin 58.

If the thermal cooling state does not exceed the predefined threshold at block 118, the preconditioning of the passenger cabin 58 may immediately begin at block 122. During block 122, the control module 66 commands the HVAC system 64 ON to achieve a desired temperature inside the passenger cabin 58. This may include either heating or cooling the passenger cabin 58. The desired passenger cabin temperature can be set at a predefined temperature value (e.g., 72° F. or some other predefined temperature value), can be based on the last known climate control setting selected using user interface 84 (i.e., the climate control setting used during a previous drive-cycle), or could be based on a remote start climate setting. The predefined temperature value of the passenger cabin 58 could be based on various other settings within the scope of this disclosure.

The passenger cabin 58 preconditioning may end at block 124. In one embodiment, the preconditioning ends if the DC fast charge event has ended (because the battery assembly 24 SOC has reached 100%) and the vehicle operator has not returned to the electrified vehicle 12. In another embodiment, the preconditioning ends if the vehicle operator has not returned to the electrified vehicle 12 after a predefined threshold amount of time. In yet another embodiment, the preconditioning ends if the vehicle operator returns to the electrified vehicle 12 and stops the charging sequence, or the charging sequence is ended by the utility grid equipment for any reason.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method, comprising:
automatically preconditioning a passenger cabin of an electrified vehicle during a direct current (DC) fast charging event of a battery assembly if the electrified vehicle is turned OFF.

2. The method as recited in claim 1, wherein the preconditioning step begins prior to the state of charge (SOC) of the battery assembly reaching a predefined threshold value.

3. The method as recited in claim 1, wherein the preconditioning step includes conditioning the passenger cabin based on a state of a climate control system of the electrified vehicle at key-off.

4. The method as recited in claim 1, comprising ending the preconditioning step if the DC fast charging event ends.

5. The method as recited in claim 1, comprising ending the preconditioning step after a predefined threshold amount of time if a vehicle operator has not yet returned to the electrified vehicle.

6. The method as recited in claim 1, comprising determining when to start preconditioning the passenger cabin prior to performing the preconditioning step.

7. The method as recited in claim 6, wherein the preconditioning step is started if the power from a charger module exceeds the amount of power that can be accepted by the battery assembly during the DC fast charging event.

8. The method as recited in claim 1, comprising determining a battery cooling thermal state of the battery assembly prior to performing the preconditioning step.

9. The method as recited in claim 8, comprising delaying the preconditioning step if the amount of cooling the battery assembly requires exceeds a predefined threshold.

10. The method as recited in claim 1, wherein the preconditioning step includes heating or cooling the passenger cabin by actuating a HVAC system of the electrified vehicle.

11. The method as recited in claim 1, wherein the preconditioning step is started if the power from a charger module exceeds the amount of power that can be accepted by the battery assembly.

12. The method as recited in claim 1, wherein the preconditioning step is started at a first start time if an ambient temperature is different from a desired passenger cabin temperature by a first amount and is started at a second, different start time if the ambient temperature is different from the desired passenger cabin temperature by a second amount.

13. The method as recited in claim 1, wherein the preconditioning step includes conditioning the passenger cabin to a level indicated by a prior climate control setting, a predefined set point or a remote start climate setting.

14. The method as recited in claim 1, comprising meeting the cooling requirements of the battery assembly prior to performing the preconditioning step.

15. The method as recited in claim 1, wherein the preconditioning step is started if an estimated time to condition the passenger cabin is greater than or equal to an estimate time to reach an 80% state of charge of the battery assembly.

16. The method as recited in claim 1, wherein the DC fast charging event uses direct current of at least 50 A to charge the battery assembly.

17. A vehicle system, comprising:
a passenger cabin;
a HVAC system configured to modify a temperature inside said passenger cabin;
a battery assembly;
a charger module configured to charge said battery assembly; and
a control module configured to command said HVAC system to precondition said passenger cabin during a direct current (DC) fast charging event.

18. The vehicle system as recited in claim 17, wherein said HVAC system includes a heater, a compressor and a HVAC case, said HVAC case housing a heating element, a cooling element and a blower.

19. The vehicle system as recited in claim 17, wherein said charger module connects between said battery assembly and an external power source, said charger module configured to selectively supply energy to charge said battery assembly during said DC fast charging event.

20. The vehicle system as recited in claim 17, comprising a user interface located within said passenger cabin and configured to enable vehicle passengers to control said HVAC system to achieve a desired temperature inside said passenger cabin.

21. The vehicle system as recited in claim 17, comprising a cooling device configured to remove heat from said battery assembly during said DC fast charging event.

22. The vehicle system as recited in claim 17, wherein said DC fast charging event uses direct current of at least 50 A to charge said battery assembly.

* * * * *